United States Patent [19]

Sadhir et al.

[11] Patent Number: 5,283,539
[45] Date of Patent: Feb. 1, 1994

[54] MONOLITHIC COMPATIBLE, ABSORPTIVE, AMPLITUDE SHAPING NETWORK

[75] Inventors: Virender K. Sadhir; David A. Willems, both of Roanoke, Va.; Kenneth S. Karsten, Bethlehem, Pa.

[73] Assignee: ITT Corporation, New York, N.Y.

[21] Appl. No.: 942,728

[22] Filed: Sep. 9, 1992

[51] Int. Cl.⁵ .............................................. H01P 1/20
[52] U.S. Cl. .................. 333/28 R; 333/204; 333/246
[58] Field of Search .......... 333/28 R, 33, 81 A, 333/204

[56] References Cited

U.S. PATENT DOCUMENTS 4,437,073  3/1984  Thal, Jr. ........................... 333/28 R

FOREIGN PATENT DOCUMENTS 2734436  2/1979  Fed. Rep. of Germany .... 333/28 R
35579    3/1980  Japan ................................ 333/28 R

*Primary Examiner*—Paul Gensler
*Attorney, Agent, or Firm*—Patrick M. Hogan; Arthur L. Plevy

[57] ABSTRACT

The present invention is an equalizer circuit for RF frequencies comprising a microstrip transmission line having a stub tuner extending transversely therefrom and further having resistive means coupled to the stub tuner to de-Q the stub tuner, thereby selectively determining an attenuation profile for the equalizer circuit.

20 Claims, 5 Drawing Sheets

MONOLITHIC COMPATIBLE, ABSORPTIVE, AMPLITUDE SHAPING NETWORK

FIELD OF THE INVENTION

The present invention relates to equalizer circuits and more particularly to an equalizer circuit which can be fabricated either as a hybrid of microstrip transmission lines and surface mounted resistors, or as part of a completely monolithic device which includes microstrip transmission lines.

BACKGROUND OF THE INVENTION

Devices that exhibit excessive amplitude and/or gain variation across a frequency band are usually "equalized" to reduce the amplitude or gain variation to less than a few dB over relatively broad frequency bands. For microwave devices a typical range would be from 6-18 GHz. Equalizer circuits, conventionally known as equalizers, are well-known in the art. Examples of such devices are found in H. Tremaine, Audio Cyclopedia §6(2d ed. 1977). Common RF applications of such equalizer circuits include gain equalization of travelling wave tubes (TWTs), amplitude equalization of radar and communication systems and so on.

Equalizers are either passive or active circuits having a predictable, controlled attenuation slope or characteristic versus frequency. Depending upon the characteristic of the signal they equalize, equalizers typically fall into one of two categories: parabolic or linear. Power tubes such as TWTs generally exhibit parabolic gain shapes where the gain is at a maximum at or near the center operating frequency and at a minimum at the furthermost operating frequencies.

Many conventional equalizers are low voltage standing-wave ratio (VSWR) and absorptive types consisting of a fixed parabolic equalizer and an absorptive fine grain equalizer (FGE). Since the bandwidth range of conventional equalizers is often too narrow to correct the gain variations encountered across the frequency bands of certain devices, for example TWTs, variable hybrid equalizers are sometimes used to equalize the amplitude or gain of such devices.

Hybrid equalizers consist of a main transmission line between an RF input and an RF output, wherein the transmission line has multiple transverse electromagnetic (TEM) mode resonant shunt branches coupled along its length. A fixed equalizer has fixed lengths for each shunt branch or stub tuner with a lossy coating at the end of each stub cavity. By contrast, a variable equalizer has variable stub lengths. By mechanically adjusting the position of a lossy coated plug at the end of a stub cavity, the electrical length and impedance, and hence the loss or equalization profile is altered. For variable equalizers, coverage of up to two and one half (2.5) octaves is common with up to 20 watts of power capability.

Conventional equalizers are designed as separate components that must be individually procured, tested and installed at the system level. Typical dimensions for fixed and variable types of equalizers operating at 6-18 GHz, 5 watts with 15 dB mid-band attenuation, are on the order of 1.25×1.0×0.5 inches. The equalization of such devices can be typically implemented at any point within a microwave system up to 1 to 5 watts. The disadvantages of conventional equalizers are: large size and weight; high cost; cumbersome handling for insertion into systems; inaccurate (cut and try) design; and incompatibility with multifunctionally designed devices placed in the same environment.

It is, therefore, an object of the present invention to provide an equalizer circuit having desired performance capabilities typical of conventional equalizers, but at a reduced weight, size and cost.

SUMMARY OF THE INVENTION

The present invention is an equalizer circuit for RF frequencies comprising a microstrip transmission line having a stub tuner extending transversely therefrom and further having resistive means coupled to the stub tuner to de-Q the stub tuner, thereby selectively determining an attenuation profile for the equalizer circuit. The equalizer circuit of the present invention can be fabricated either as a hybrid of microstrip transmission lines and surface mounted resistors, or as part of a completely monolithic device which includes microstrip transmission lines. Both hybrid and monolithic equalizer circuits have desired operating capabilities typical of conventional equalizers, but are smaller, lighter and less expensive.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE FIGURES

Figure 1:
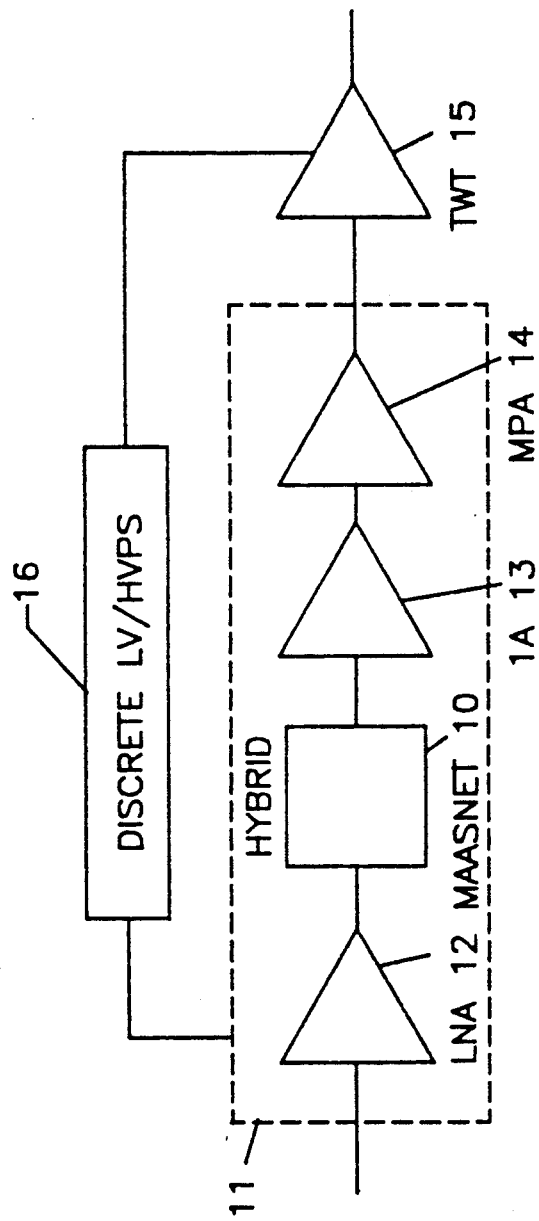
FIG. 1 is a block diagram depicting an equalizer circuit as a hybrid component in a low-noise travelling wave tube driver.

Referring to FIG. 1 there is shown a monolithic compatible, absorptive, amplitude shaping network (MAASNET) equalizer circuit 10. The equalizer circuit 10 is depicted as one hybrid component in a hybrid amplifier device used as a low-noise TWT driver The hybrid driver 11 also includes a low-noise amplifier (LNA) 12, an isolation amplifier (IA) 13 having a given gain, and a medium-power amplifier (MPA) 14. The input of the LNA 12 corresponds to the input of the hybrid driver 11. The output of the LNA 12 is coupled to the input of the MAASNET equalizer circuit 10 and the output of the equalizer circuit 10 is coupled to the input of the IA 13. The output of the IA 13 is coupled to the input of the MPA 14. The output of the MPA 14, which corresponds to the output of the hybrid driver 11, is coupled to the input of a TWT 15 which receives operating potential from a power supply (LV/HVPS) 16. The LV/HVPS 16 also supplies operating potential to the hybrid driver 11. The MAASNET equalizer circuit 10 operates to equalize the gain characteristic of the LNA 12 and to match impedances between the LNA 12 and the MPA 14. This action allows the output of the LNA 12 to be further amplified by the MPA 14.

Since the hybrid driver 11 of FIG. 1 includes the hybrid MAASNET equalizer 10, the TWT 15 employed can be smaller and lighter than a single high gain TWT without gain equalization as may be implemented in the prior art. The overall size reduction between the MAASNET equalizer and conventional equalizers, using presently available state of the art components, is on the order of 30% for the type of application shown in FIG. 1.

The MAASNET equalizer circuit 10, which utilizes microstrip transmission lines, can be incorporated into a multifunctional chip consisting of various circuits, e.g., LNA and MPA. Because the MAASNET equalizer is a planar circuit it can be fabricated either as a monolithic microwave integrated circuit (MMIC) or as a microwave integrated circuit (MIC) which is a planar hybrid on a ceramic. No degradation in the equalizer circuit's performance results from the lossy nature of the circuit, even if preceding and succeeding circuits have poor VSWRs.

Microstrip transmission lines, which are transmission lines consisting of a conductor above or between extended conducting surfaces, are used in circuits where discrete devices are bonded to the circuit, where easy access is needed for tuning, and where a compact design is needed. Although microstrip lines are only approximately a TEM transmission line, unless the circuit is to be used for very broad bandwidth applications or it is physically many wavelengths long, dispersion will not be a problem.

Monolithic RF circuits are usually designed on a thin semi-insulating GaAs or other semiconductor substrate. By definition, a monolithic circuit is formed completely by a deposition method such as liquid phase epitaxy, vapor phase epitaxy, etc. Among the circuit elements which can be formed on monolithic substrates are transmission lines, thin-film resistors, FETs used as amplifiers or resistors, and transmission line stubs. Microstrip transmission lines in monolithic devices can be made with a characteristic impedance as high as 90 ohms on a 125 μm GaAs substrate. Since a monolithic circuit is manufactured using automated techniques, no final adjustment can be made on it after it has been produced. The circuit design must therefore rely heavily on computer modeling and optimization. Monolithic circuits are ideal for microwave applications requiring large numbers of compact units because they offer low manufacturing costs and good unit-to-unit repeatability.

MMIC and MIC configured equalizer circuits are approximately ten times smaller and lighter than conventional equalizers. The interconnections at chip level for MMIC and MIC configured equalizers in a multifunctional circuit are such that separate RF input and RF output connectors, e.g. SMA type connectors for 6-18 GHz, are eliminated. In addition, the need for the package housings used in conventional equalizers is also eliminated.

Equalizers manufactured by MMIC or MIC planar circuit fabrication technologies are less costly than standard conventional equalizers. A conventional four cavity equalizer costs approximately $400 if ordered in quantities of at least 200 such devices. By contrast, the connectorized MAASNET equalizer designed on a ceramic (MIC) would cost approximately $50 and the MAASNET equalizer designed as part of a monolithic chip (MMIC) would cost approximately $20 when incorporated in a multifunctional module.

Figure 2:
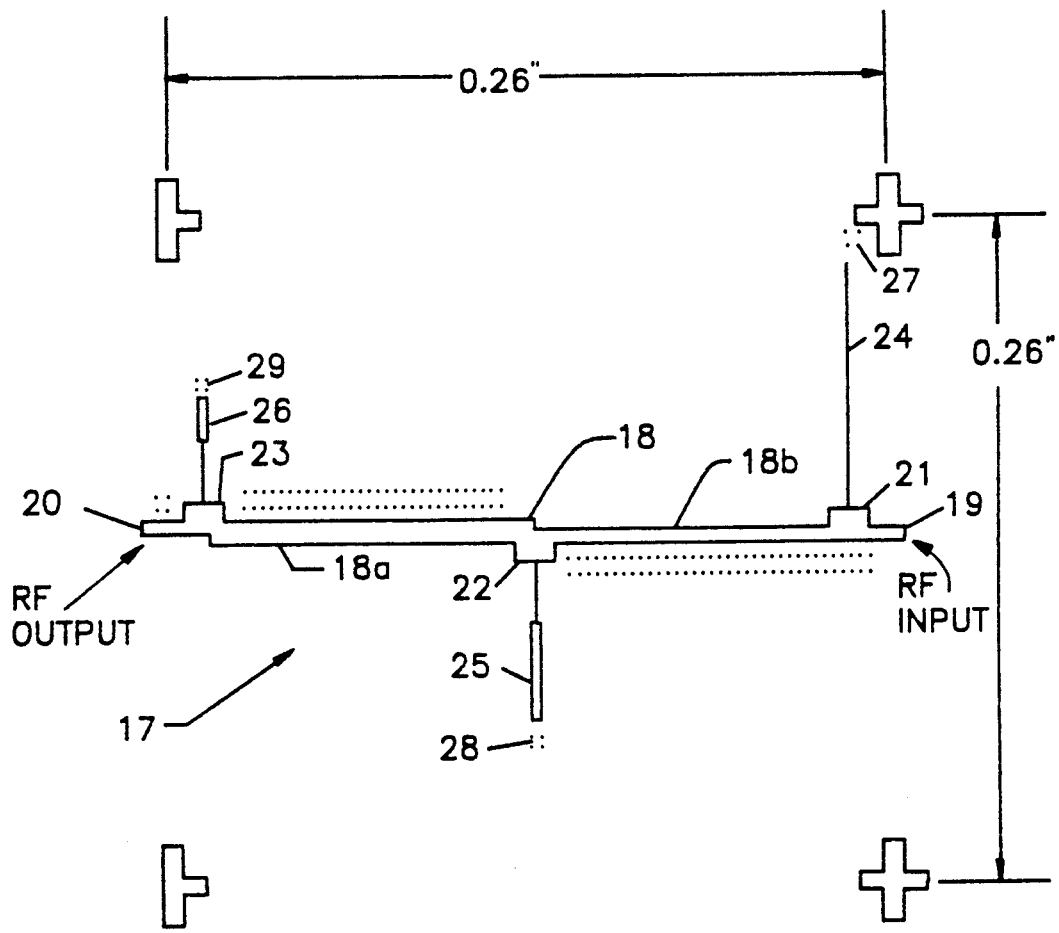
FIG. 2 shows a hybrid embodiment of an equalizer circuit without surface mounted resistors, according to this invention.

FIG. 2 shows an equalizer circuit 17 having dimensions 0.26×0.26 inches. The equalizer circuit 17 includes a main transmission line 18 which is directed between an RF input terminal 19 and an RF output terminal 20 with three fixed length stub tuners 21, 22 and 23 extending perpendicular to the main transmission line 18. In the embodiment depicted in FIG. 2, main transmission line 18 is shown having a first section 18a and a second section 18b. As will be readily appreciated by those of ordinary skill in the art, the dimensions of each section determines its characteristic impedance. As shown in FIG. 2, section 18b is narrower than section 18a and thus has a higher characteristic impedance. Manual fine tuning of the stubs 21, 22 and 23 is accomplished by bonding the open-ended lines 24, 25 and 26 to the small metallization pads 27, 28 and 29.

Figure 3:
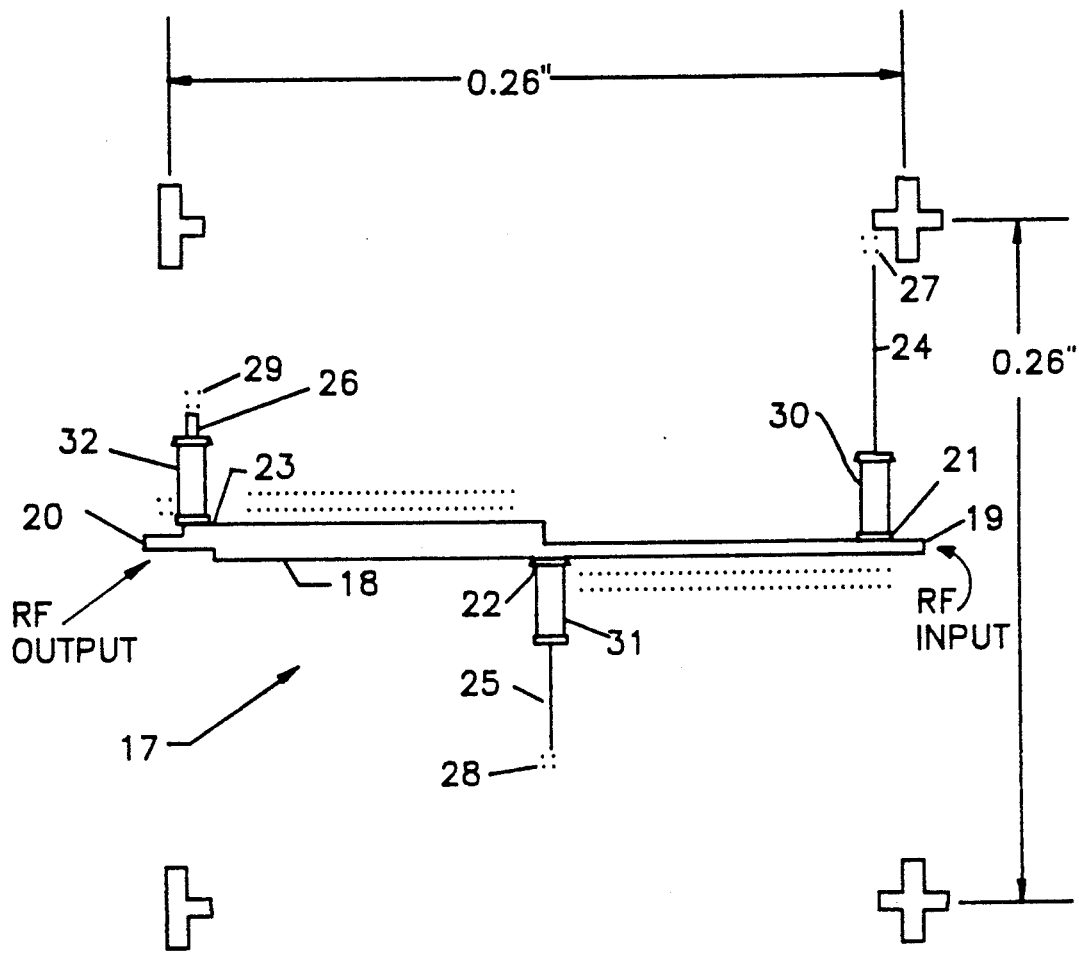
FIG. 3 shows the hybrid embodiment of the equalizer circuit shown in FIG. 2, with surface mounted resistors.

FIG. 3, shows the equalizer circuit 17 shown in FIG. 2. Numerals used in FIG. 2 are employed in FIG. 3 to denote identical parts. The circuit 17 employs lossy coupling of the stub tuners 21, 22 and 23 to the main transmission line 18 accommodated via surface-mounted resistors 30, 31 and 32. In a monolithic design, the surface-mounted resistors are replaced by thin-film resistors. As compared to conventional equalizers, cut and try designs are greatly reduced for the MAASNET equalizer. The circuit is easily modelled on commercially available microwave CAD tools such as Touchstone. The entire circuit including all microstrip lines and surface mounted resistors are modelled before embarking on the fabrication.

Figure 4:
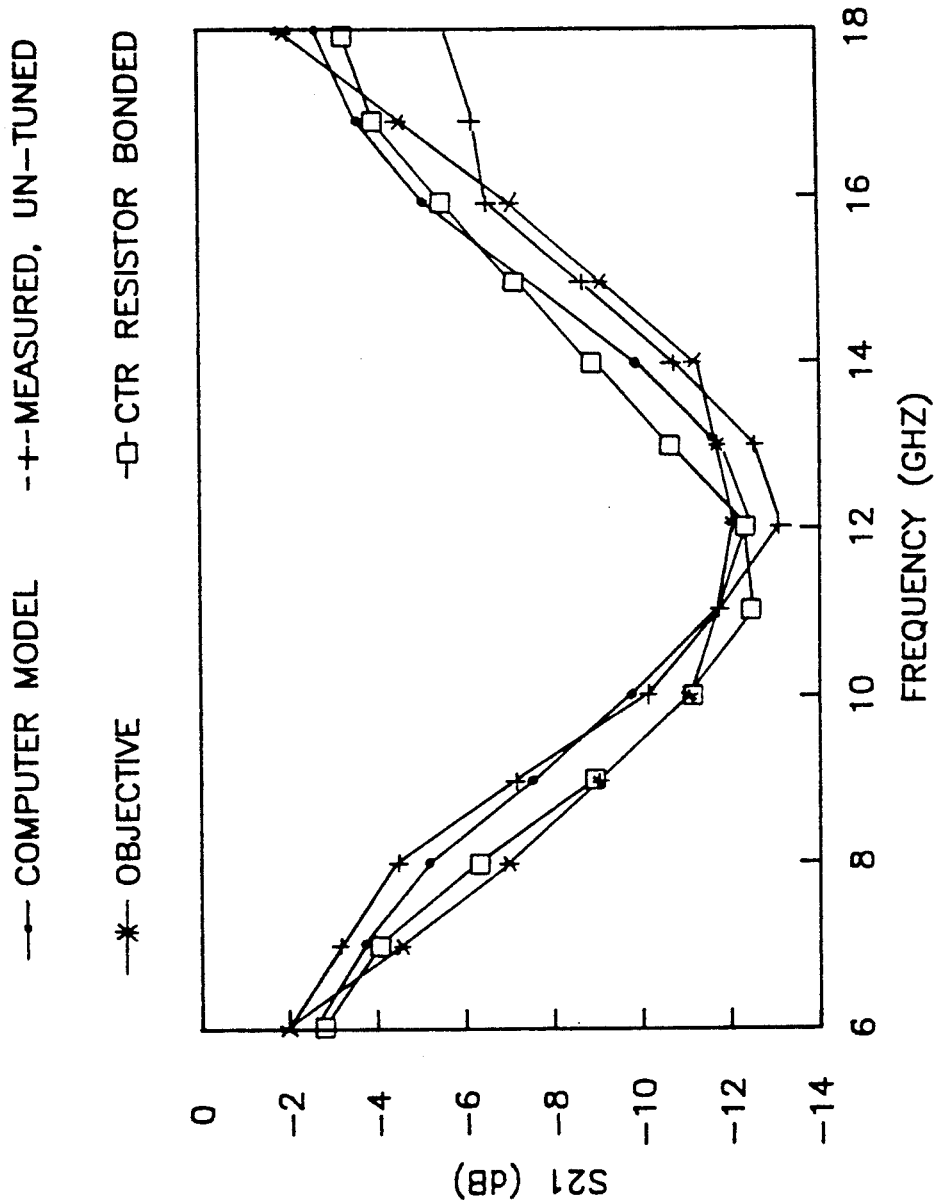
FIG. 4 is a graph showing the frequency v. Attenuation response curves for tuned and untuned embodiments of the present invention, a response curve for a computer model of the present invention, and an objective response curve.

In FIG. 4, the frequency v. attenuation response curves of both tuned and untuned MAASNET equalizer circuits, as well as the response curve of a computer model of the MAASNET equalizer circuit, and a desired objective response curve are shown, where the horizontal axis represents frequency in GHz and the vertical axis represents attenuation in dB. As can be seen from FIG. 4, the measured responses of both the tuned and the untuned MAASNET equalizer circuits show good correlation to both the response of the computer model and the objective response. In conventional equalizers, greater attenuation is obtained by adding additional circuit elements. The simplest conventional equalizer will have two elements and 8 dB of mid-band attenuation with a reasonable VSWR. As additional elements or tuning stubs are added to the circuit, the mid-band attenuation increases up to 6 dB per element at the expense of increased size. The greater the number of circuit elements the better the resolution and control of the amplitude profile. By contrast, the MAASNET equalizer circuit is able to obtain greater attenuation without adding circuit elements and hence without increasing the size and weight of the equalizer. The MAASNET equalizer circuit does this by optimizing both the values of surface mount resistors and the dimensions of the microstrip lines for the hybrid or monolithic versions as detailed below in the description of FIG. 5. The size of the MAASNET equalizer circuit can be kept the same despite altering its performance specifications by meandering or bonding the increased line length to obtain a specific response.

The present invention utilizes a band-stop filter configuration to synthesize the monolithic gain equalization with a parabolic attenuation profile. The frequency selective absorption resulting in the parabolic attenuation profile is implemented by monolithic lossy stub tuners. The relatively lossless stub tuners are de-Qed by the resistors. The resonant frequencies of the lossy stub tuners control the frequency band of the attenuation profile. The different lengths and/or widths of the open ended lines 24, 25, and 26 of the stub tuners transform varying impedances at the resistor plane. At the center bandwidth, maximum microwave energy is dissipated in the stub tuners as the resistors see very low RF impedance termination. As the circuit detunes from bandcenter, the impedance offered at the resistor planes changes, decreasing the amount of dissipation energy in the stub tuners.

Figure 5:
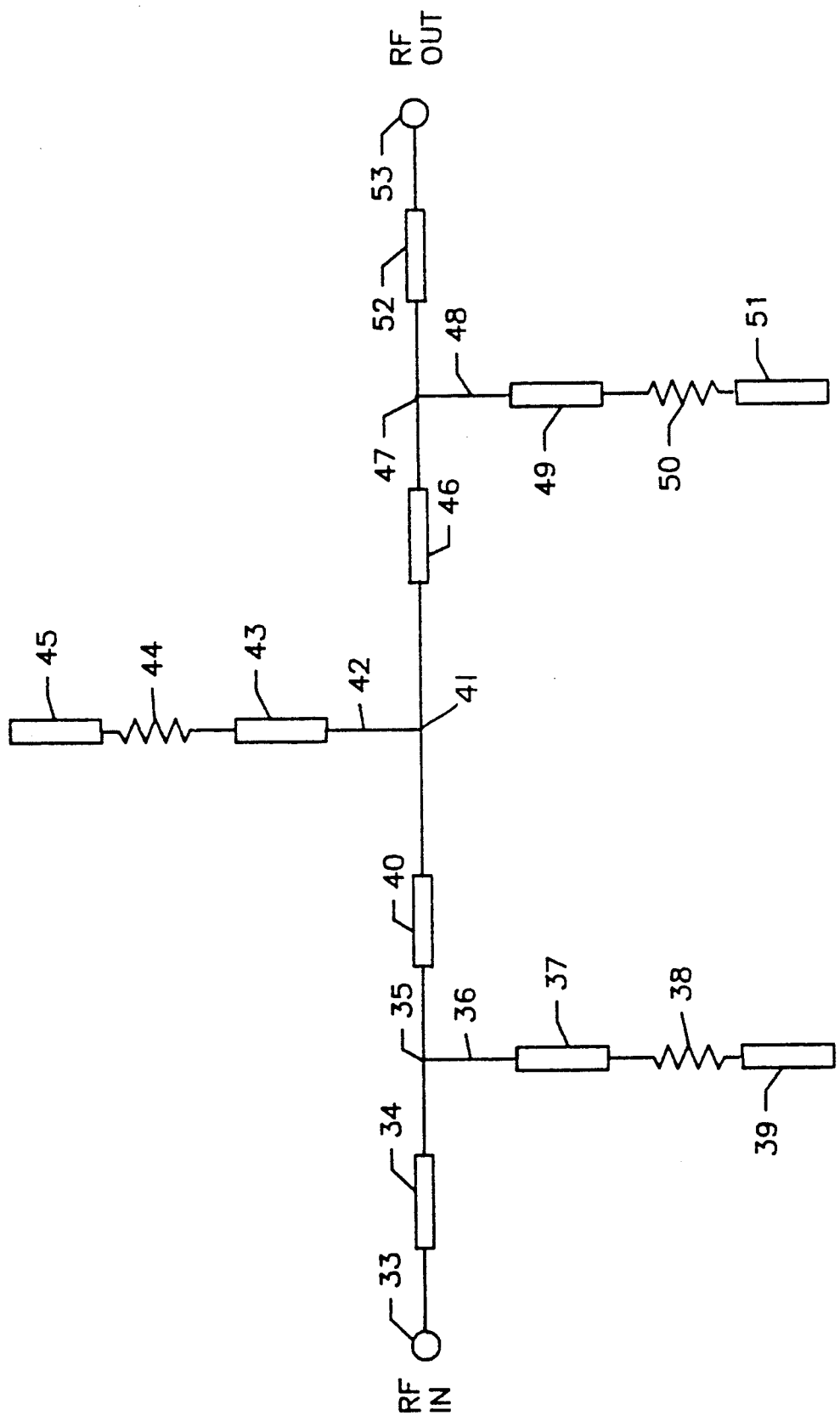
FIG. 5 is a circuit diagram of one embodiment of the present invention.

FIG. 5 is an alternative embodiment of the present invention in which the equalizer circuit was designed and fabricated on 15-mil thick alumina substrate and designed to operate in the frequency range of from 6 to 18 GHz. The design has three lossy stub tuners which are connected to a main transmission line comprised of a plurality of microstrip lines coupled in series. The microstrip lines of the main transmission line are approximately $\lambda/4$ apart at the center frequency, where $\lambda$ is determined from the ratio of the speed of light to the center frequency. The dimensions and values of both the microstrip lines and the resistors were arrived at after optimizing for a parabolic attenuation curve and In/Out VSWR.

The RF input terminal 33 of the equalizer circuit shown in FIG. 5 is coupled to the input terminal of microstrip line 34 which is 8 mils wide and 9.75 mils long. The output terminal of microstrip line 34 is coupled to T-junction 35 which has an outgoing shunt path 36. Shunt path 36 is comprised of the series combination of microstrip line 37, resistor 38 and microstrip line 39. Microstrip line 37 is 14.5 mils wide and 15 mils long. The output terminal of line 37 is coupled to the input terminal of the 55-$\Omega$ GaAs resistor 38. The output terminal of resistor 38 is coupled to the input terminal of open-ended microstrip line 39 which is 1 mil wide and 80 mils long. Microstrip line 40, which is 8 mils wide and 90 mils long, is coupled between T-junction 35 and T-junction 41. T-junction 41 has an outgoing shunt path 42 comprised of the series combination of microstrip line 43, resistor 44 and microstrip line 45. Microstrip line 43 is 14.5 mils wide and 8.25 mils long. The output terminal of line 43 is coupled to the input terminal of the 30-$\Omega$ GaAs resistor 44. The output terminal of resistor 44 is coupled to the input terminal of open-ended microstrip line 45 which is 2 mils wide and 70 mils long. Microstrip line 46, which is 12 mils wide and 113.3 mils long, is coupled between T-junction 41 and T-junction 47. T-junction 47 has an outgoing shunt path 48 comprised of the series combination of microstrip line 49, resistor 50 and microstrip line 51. Microstrip line 49 is 14.5 mils wide and 10 mils long. The output terminal of line 49 is coupled to the input terminal of the 200-$\Omega$ resistor 50. The output terminal of resistor 50 is coupled to the input terminal of open-ended microstrip line 51 which is 6 mils wide and 20 mils long. Microstrip line 52, which is 5.1 mils wide and 10 mils long, is coupled between T-junction 47 and the RF output terminal 53 of the equalizer circuit.

The advantages of the present design lie in its monolithic configuration. No via-hole or wrap-around technique is needed for RF on ground. The parabolic response can be linearized over a frequency band by increasing the number of the circuit elements. Over its linear range, the MAASNET equalizer can be used in the input matching circuit of solid-state amplifiers to obtain flat gain responses. This is accomplished by gain equalization of 6 dB/octave gain roll-off slope of the active devices. It is not necessary to increase the number of circuit elements to increase the equalizer circuit's attenuation level or profile. The attenuation range or profile of the equalizer circuit can be changed simply by varying the resistor values and reoptimizing the microstrip line widths and lengths to fit the required response curve.

It will be understood that the embodiment described herein, including the resistor values given and the given widths and lengths of the various microstrip lines, is merely exemplary and that a person skilled in the art may make many variations and modifications to the described embodiment utilizing functionally equivalent elements to those described. Any variations or modifications to the invention just described are intended to be included within the scope of said invention as defined by the appended claims.

We claim:

1. An equalizer circuit for RF frequencies, comprising:
   a main microstrip transmission line having an RF input port and an RF output port;
   a first stub tuner being adapted to resonate at a first resonant frequency and including a first microstrip transmission line coupled to said main transmission line and extending transversely therefrom;
   first resistive means coupled to said first stub tuner and adapted to de-Q said first stub tuner;
   a second stub tuner being adapted to resonate at a second resonant frequency different from said first resonant frequency and including a second transmission line coupled to said main transmission line and extending transversely therefrom; and
   second resistive means coupled to said first stub tuner and adapted to de-Q said second stub tuner.

2. The equalizer circuit according to claim 1, wherein said equalizer circuit is fabricated as a hybrid circuit on a substrate.

3. The equalizer circuit according to claim 1, wherein said equalizer circuit is fabricated as part of a monolithic device.

4. The equalizer circuit according to claim 2, wherein said resistive means are surface-mounted resistors.

5. The equalizer circuit according to claim 3, wherein said resistive means are thin-film resistors.

6. The equalizer circuit according to claim 1, further including:
   a third stub tuner adapted to resonate at a third resonant frequency different from said first and second resonant frequencies, said third stub tuner including a third transmission line coupled to said main microstrip transmission line between said first and second stub tuners and extending transversely from said main transmission line; and
   second resistive means coupled to said first stub tuner and adapted to de-Q said third stub tuner, wherein said equalizer circuit utilizes a band-stop filter configuration of said stub tuners to achieve a parabolic attenuation profile.

7. The equalizer circuit according to claim 6, wherein said main microstrip transmission line includes a first section having a first characteristic impedance and a second section coupled to said first section and having a second characteristic impedance, said first impedance being different from said second impedance and said impedances being determined by the dimensions of said sections.

8. The equalizer circuit according to claim 7, wherein the first and second stub tuners are coupled to said first and sections, respectively, and said third stub tuner is coupled to the main transmission line at the junction between said first and second sections.

9. The equalizer circuit according to claim 7, wherein said main transmission line further includes third and fourth sections, each of said sections being separated by a quarter-wavelength at the band stop center frequency.

10. The equalizer circuit according to claim 1, wherein said equalizer circuit is a component of a solid state low-noise travelling wave tube driver.

11. The circuit according to claim 1, wherein said equalizer circuit is a component of a wideband microwave electronic countermeasure transmitter.

12. An equalizer circuit for RF frequencies, comprising:
- a main microstrip transmission line having an RF input port and an RF output port, said main microstrip transmission line including a first section of a given width and length between said RF input port and said central line and a second section of a different width and length between said central line and said RF output port;
- a first transverse microstrip transmission line forming a first stub tuner extending transversely from said main microstrip transmission line proximate said RF input port;
- a second transverse microstrip transmission line forming a second stub tuner extending transversely from said main microstrip transmission line proximate said RF output port;
- first resistive means coupled to said first stub tuner to de-Q said first stub tuner thereby selectively determining an attenuation profile for said equalizer circuit;
- second resistive means coupled to said second stub tuner to de-Q said second stub tuner thereby selectively determining an attenuation profile for said equalizer circuit;
- a central transverse microstrip transmission line forming a central stub tuner extending transversely from said main microstrip transmission line proximate a central line between said first stub tuner and said second stub tuner; and
- central resistive means coupled to said central stub tuner to de-Q said central stub tuner thereby selectively determining said attenuation profile.

13. The equalizer circuit according to claim 12, wherein said equalizer circuit is fabricated as a hybrid circuit on a substrate.

14. The equalizer circuit according to claim 12, wherein said equalizer circuit is fabricated as part of a monolithic device.

15. The equalizer circuit according to claim 13, wherein said resistive means are surface-mounted resistors.

16. The equalizer circuit according to claim 14, wherein said resistive means are thin-film resistors.

17. An equalizer circuit for RF frequencies, comprising:
- a main microstrip transmission line having a first plurality of microstrip transmission lines coupled in series between an RF input port and an RF output port, wherein said first plurality of microstrip transmission lines are separated by T-junctions;
- a stub tuner having a second plurality of microstrip transmission lines coupled in series between a first end and a second end, wherein said first end is coupled to one of said T-junctions, said stub tuner further having resistive means coupled between each of said second plurality of microstrip transmission lines to de-Q said stub tuner thereby selectively determining an attenuation profile for said equalizer circuit.

18. The equalizer circuit according to claim 17, wherein said equalizer circuit is fabricated as a hybrid circuit on a substrate.

19. The equalizer circuit according to claim 17, wherein said equalizer circuit is fabricated as part of a monolithic device.

20. The equalizer circuit according to claim 17, wherein said main microstrip transmission line is comprised of four microstrip lines coupled in series and separated by three T-junctions.

* * * * *